United States Patent Office 3,049,536
Patented Aug. 14, 1962

3,049,536
METHOD FOR PRODUCING INOSINE
Ferdinand Reiff, Mannheim-Waldhof, Gerhard Huber, Frankfurt, and Kurt Holle, Mannheim-Waldhof, Germany, assignors to Zellstoff Fabrik Waldhof, Mannheim-Waldhof, Germany
No Drawing. Filed Jan. 21, 1960, Ser. No. 3,716
Claims priority, application Germany June 27, 1956
32 Claims. (Cl. 260—211.5)

The present invention relates to a method of producing inosine, and more particularly to a method of producing and recovering inosine by the de-amination of adenosine and the separation of the inosine from the formed reaction mass.

This application is a continuation-in-part application of our copending application Serial Number 666,761, filed June 19, 1957, for "Method of Producing Inosine," now abandoned.

Adenosine, which is a split-product of nucleic acid is known to be a N-glycoside of purine and ribose. The inosine can be obtained from the adenosine by de-amination. Inosine has recently become extremely important technically, especially as a stabilizer in the production of blood for storage.

It is known that inosine can be obtained by the de-amination of adenosine. The hitherto described methods for the production of inosine in this manner suffer from various difficulties, particularly the very low yield, which makes this method more or less unusable from the technical standpoint.

It is further known that the adenosine can be de-aminated by means of nitrous acid, and further that the nitrous acid can be formed in the solution by means of sodium nitrite or barium nitrite and acetic acid or sodium nitrite and sulfuric acid. This reaction of nitrous acid with adenosine is however an incomplete reaction. Furthermore, some impurities present in the reaction solution prevent the recovering of satisfactory yields.

It is therefore an object of the present invention to provide a method of de-aminating adenosine to form inosine by means of nitrous acid whereby a satisfactory de-amination of the adenosine and a recovering of good yields of inosine from the reaction solution are possible.

With this object in view, the present invention mainly consists in the treating of a solution of adenosine with sufficient excess of nitrous acid to quantitatively convert all of the adenosine to inosine, whereby a reaction solution containing inosine and being substantially free of adenosine is obtained. By the term "solution of adenosine" there is meant in this specification any solution of adenosine regardless of the fact that possibly some adenosine may be undissolved and merely suspended in the solution.

The amount of nitrous acid utilized for the de-amination of substantially all of the adenosine should be at least 5 mols of nitrous acid per each mole of adenosine, and even more preferably should be at least 10 mols of nitrous acid for each mol of adenosine and is preferably 15–20 mols per mol of adenosine.

According to a preferred method of operation in accordance with the present invention inosine is obtained in very good yield by de-amination of adenosine by means of nitrous acid formed in the reaction medium by reaction of a nitrite and an acid, and the inosine can be obtained from the resulting solution by crystallization, by carrying out the reaction with an excess of nitrous acid at a pH value of numerically not less than 1.5 and preferably between 1.9 and 4.0.

It is preferred to carry out the reaction with such an excess of nitrous acid that, due to the disproportionation, formed nitric acid would lower the pH of the reaction medium to below 1.5, but to neutralize during the reaction so that the pH value does not fall below 1.5. By preventing the lowering of the pH value to below 1.5 the formation of troublesome hypoxanthine is avoided and as a result practically quantitative de-amination of the adenosine can be achieved while simultaneously obtaining inosine in a salt-poor and acid-poor solution from which the inosine can easily be substantially completely separated by crystallization.

Or, in accordance with the present invention it is also possible to remove any nitric acid formed due to disproportionation by an anion exchanger.

The maintaining of the pH value of the reaction solution at a value which is numerically not less than 1.5 can be achieved in per se known manner. During the formation of the nitrous acid in the reaction solution of the adenosine, for example by the addition of sulfuric acid to the reaction solution containing a nitrite such as sodium nitrite, care should be taken that the pH does not fall below 1.5 due to the formation of nitric acid. If, during the course of the reaction the pH value starts to drop to an undesirably low value by the formation of nitric acid, the nitric acid which is formed may be neutralized by the very careful addition of a base such as sodium hydroxide. By working carefully it is possible to carry out the reaction without the formation of any disturbing amount of salt.

This quantitative de-amination of adenosine to form inosine in and of itself provides for a great advantage in the production of inosine by the de-amination of adenosine. The inosine may be directly crystallized from the reaction solution, which, by following the conditions of the present invention is acid-poor and salt-poor, and substantially free of adenosine and hypoxanthine, thus permitting direct crystallization of the inosine from the solution. However, still better yields of the inosine may be obtained by a new method of isolation thereof in accordance with a further embodiment of the present invention.

It is a further object of the present invention to provide a new method of separating the inosine produced by the de-amination of adenosine from the reaction mass containing the inosine whereby the inosine can be recovered in substantially pure form by simple treatment methods so that the yield of inosine can be increased in a technically simple manner.

It is still another object of the present invention to provide a method of recovering inosine produced by the de-amination of adenosine, which method in combination with the substantially quantitative conversion of adenosine to inosine by means of the present invention provides for extremely high yield of inosine in a simple and economical manner.

With these objects in view, the present invention mainly comprises the treating of adenosine with a de-aminating agent such as nitrous acid in order to form a reaction mass including the inosine, further treating this reaction mass with a silver salt so as to convert the inosine to the silver salt thereof which can easily be separated from the reaction mass, separating the silver salt of the inosine from the reaction mass, and recovering inosine from the separated silver salt.

The above set forth method is particularly advantageous in the production of inosine by the treatment of a solution of adenosine with a de-aminating agent to form a reaction solution including the inosine. The treatment of this reaction solution with a silver salt results in the production of the silver salt of inosine which precipitates from the reaction solution. It is then a simple matter to separate the precipitated silver salt from the reaction solution and to recover the inosine therefrom.

The de-amination of the adenosine is preferably carried out as described above by the treatment with nitrous acid, and most preferably with an amount of at least 5 mols, and still better with at least 10 mols (most preferably 15–20 mols) of nitrous acid per each mol of adenosine in order to de-aminate substantially all of the adenosine and form a reaction solution containing inosine and being substantially free of adenosine. As set forth above, it is preferred to operate at pH value which is numerically not less than 1.5, and preferably at a pH of about 1.9–4.0.

The nitrous acid can be formed in situ for the de-amination of the adenosine by the reaction of an inorganic nitrite such as sodium nitrite or barium nitrite with an acid which is adapted to react with the nitrite to form nitrous acid, for example acetic acid or sulfuric acid. The de-amination according to the present invention results in complete conversion of the adenosine to inosine, and the further treatment of the inosine with a silver salt to form the silver salt of the inosine can provide for a substantially complete recovery of the inosine which is produced.

Instead of utilizing an inorganic nitrite and an acid to form the nitrous acid for the de-amination of the adenosine, it is possible to de-aminate the adenosine directly by treatment thereof with an organic derivative of nitrous acid, for example ethyl nitrite, preferably by addition of an acid.

In carrying out the de-amination by means of ethyl nitrite the considerable acidification of the reaction solution by means of a strong acid, for example with acetic acid, may be avoided. However, in practical carrying out of this embodiment of the invention it is preferred to add a small amount of an acid such as acetic acid. This amount may be kept at a minimum in order that during the course of the reaction it may not become necessary to neutralize the acid in order to maintain a pH value which is numerically not less than 1.5.

As a result, it is simple according to this embodiment to maintain proper pH and to avoid the formation of large amounts of salt such as sodium acetate which interfere with the crystallization of the inosine.

The most preferred silver salt for the treatment of the reaction mass or reaction solution containing the inosine in order to convert the inosine to the silver salt thereof is silver sulfate. However, other soluble silver salts are suitable, such as silver nitrate, silver acetate, silver chlorate, silver fluoride and so on. The amount of the silver salt such as silver sulfate which should be utilized is simply determined by the addition of the silver salt in small portions until no additional silver salt of inosine is precipitated.

According to a preferred embodiment of the present invention the reaction solution containing inosine is preferably first neutralized and then treated with a silver salt in order to form the silver salt of inosine.

The separation of the inosine from the silver salt thereof can easily be carried out, and the most preferred method for accomplishing this is to simply treat the silver salt with hydrogen sulfide which forms silver sulfide which is extremely insoluble and can easily be separated from the inosine. The method of treating the silver salt of the inosine for the separation of the inosine therefrom is most simply accomplished by suspending the silver salt of inosine in water and treating the formed mixture with hydrogen sulfide. The inosine which is freed from the silver salt thereof may then be dissolved in a solvent therefor and substantially pure inosine may be recrystallized from the thus formed solution. Other methods are likewise suitable for the separation of the inosine from the silver salt thereof. For example, this separation may be accomplished by treating the silver salt with hydrochloric acid which forms insoluble silver chloride which can easily be separated from the inosine.

The method of quantitatively converting the adenosine to inosine by treatment of the adenosine with an excess of nitrous acid or the like provides for an increased yield of inosine, and even more surprisingly it provides for the improved recovery of the inosine due to the fact that the resulting reaction solution is substantially free of adenosine. Furthermore, the recovered inosine has a particularly high purity. The recovery of the inosine by treatment of the reaction solution with a silver salt to form the silver salt of the inosine from which the free inosine can easily be obtained is particularly advantageous in providing for practically quantitative recovery of the inosine and in the obtaining of the inosine in extremely pure form.

As indicated above, it is possible to substantially quantitatively convert the adenosine by the use of a large excess of nitrous acid, e.g. at least 5 mols of nitrous acid per each mol of adenosine and preferably at least 10 mols and still better 15–20 mols of nitrous acid per each mol of adenosine. The actual excess amount of nitrous acid depends upon the particular reaction conditions in the particular case. For example, the de-amination can be so carried out that gaseous nitrogen oxide is introduced from outside the vessel into the reaction vessel. In addition, as indicated above, it is possible to form the nitrous acid in situ by treatment of nitrite salts with an acid. It is also possible to utilize organic derivatives of nitrous acid, such as ethyl nitrite, methyl nitrite, butyl nitrite, propyl nitrite, isoamyl nitrite, in order to accomplish the de-amination of the adenosine, in which case, of course, greater excesses of the reagent must be utilized than in the case of the use of nitrous acid itself or nitrite salts from which nitrous acid is formed by reaction with an acid. In general, the use of at least 10 mols of nitrous acid or its equivalent per each mol of adenosine is preferred.

Particularly good crystallization of the inosine from the reaction solution is obtained by maintaining during the de-amination a pH value which is numerically not less than 1.5 in the reaction solution, thereby preventing formation of hypoxanthine. On the other hand, it is preferred to use a sufficient excess of nitrous acid to obtain in the solution a numerical pH value below 1.5, which excess corresponds to that necessary to substantially complete the de-amination of the adenosine. Simultaneously there is maintained a pH value of at least 1.5 in said solution by neutralizing any formed nitric acid. This results in the formation of a solution of inosine free of nitric acid and hypoxanthine and also practically free of any salt and adenosine from which pure inosine may be crystallized.

It has also been found that the difficulties in connection with the use of the excess of nitrous acid and the formation of nitric acid during the reaction can be avoided if the nitric acid is removed from the reaction solution by means of an anion exchanger. It is particularly suitable to utilize in this connection weakly basic ion exchangers which are in the bicarbonate form. Preferably the nitric acid is removed by means of an exchanger only to a pH value of the inosine solution of about 4–5 because in order to remove the last portion of the nitric acid a large excess of exchanger is necessary. Furthermore it has been found that the neutralization of the still remaining acid residues with sodium hydroxide or the like, which results in the formation of small amounts of nitrates, does not hinder the crystallization of the inosine from the solution.

The de-amination reaction can be carried out in the usual manner following the usual rules for organic chemical treatment of this type. It is particularly advantageous not to carry out the reaction too quickly, and particularly not to introduce the entire amount of reagents at one time, but rather to carry out the reaction slowly by the slow addition of the reagents to each other. For example the reaction can be carried out stepwise in which the reagents are introduced in small portions. It is also possible to carry out the reaction by the constant addition of the reagents and to thereby obtain a homogeneous conversion reaction. In this manner it is possible to avoid any sudden and turbulent reaction and thereby to avoid losses of nitrous acid so that the reaction can be carried forth without difficulties.

In accordance with the present invention there is obtained in a single and simple procedure a yield of crude inosine of 85% and of pure inosine of 75%, while with all of the known methods despite complicated working procedures it is hardly possible to obtain a yield of more than 50%. The obtained inosine can be purified by recrystallization and is in this form suitable for all applications, including those of the pharmaceutical field.

The following examples will further illustrate the method of the present invention. The invention is of course not meant to be limited to the specific details of the examples.

EXAMPLE I

The De-amination of Adenosine 20 g. of adenosine are dissolved in 1 liter of water by warming, and after cooling to room temperature 120 g. of barium nitrite (monohydrate) are added to the solution. Under stirring there is added in time intervals of one hour 160 cc. of 2 normal sulfuric acid after each time interval. After the third addition, the reaction mass is allowed to stand for three hours at room temperature. The solution is then tested for barium, and if some barium is still present a slight excess of sulfuric acid is added. 300 cc. of methanol is then added. In order to drive off the excess of nitrous acid, $CO_2$ is conducted through the solution until the solution is free of nitrous acid as determined by testing with potassium iodide-starch paper. The precipitated barium sulfate is separated by centrifugation. The residue is washed one time with about 500 cc. of water. The total volume of the centrifugate is about 2.3 liters.

Isolation of Inosine by Ion Exchange Method

Half of the above clear centrifugate (1.15 liters) is treated with 250 cc. of anion exchange (bicarbonate form) and stirred together therewith for 16 hours at room temperature. The pH value is increased thereby to about 4–5. The ion exchanger is filtered off under suction and washed three times, each time with 150 cc. of water. The solution is brought to a pH value of 7 by means of normal sodium hydroxide (total volume of the solution about 1.55 liters), and concentrated to a volume of about 100 cc. under vacuum.

The inosine is crystallized over night in an ice box and the inosine is then filtered off by suction, washed with a small amount of ice water and dried at a temperature of 105° C. A first fraction of crude inosine consisting of 5.4 g. having a purity of 99% is obtained. Further fractions of crude inosine are obtained from the mother liquid by concentration, the total amount constituting 3.2 g. having a purity of 96–98%. The yield of crude inosine is 8.6 g. which is equal to 86%.

Isolation of Inosine by Treatment With a Silver Salt

The other half of the clear centrifugate from the de-amination (1.15 liters) is precisely neutralized with normal sodium hydroxide solution. The volume is about 1.25 liters. A total of 1.5 liters of a 0.8% silver sulfate solution is slowly introduced while stirring. After a short time (5 minutes) it is neutralized with sodium hydroxide and the precipitate of silver inosine is centrifuged off after 2 hours and washed three times, each time with 0.5 liter of water. The residue is suspended in water, the suspension treated with normal sulfuric acid to a pH value of 2, and sulfided with a vigorous hydrogen sulfide stream. The silver sulfide precipitate is centrifuged off and washed with water. The centrifugate and the wash water are neutralized with barium hydroxide and the excess barium precipitated by means of sodium sulfate. The barium sulfate is separated by centrifugation. The clear solution is concentrated under vacuum to about 250 cc. and allowed to stand over night in an ice box for crystallization. The crude inosine is filtered off under suction, washed with ice water and dried at 105° C. The first fraction consists of 5.2 g. Further fractions totaling 2.2 g. are obtained from the mother liquor by concentration. The total yield of crude inosine is 8.4 g. which is equal to 84%.

Recrystallization of the Crude Inosine 17.0 g. of crude inosine are dissolved in 400 cc. of 80% ethanol in a water bath, filtered while hot and brought to crystallization in an ice box. After standing over night the crystalline material is filtered off under suction and washed with ice water. The pure inosine is dried in a drying chamber at a temperature of 105° C. The yield of pure inosine is 15.0 g. which is equal to 75%. The yield can be further increased by working up the mother liquor of the crystallization as set forth above.

EXAMPLE II 100 g. of adenosine are dissolved in 5 liters of water by warming, and after cooling down to room temperature 420 g. of sodium nitrite are added to the solution. Under stirring there are added in time intervals of one hour 1.5 liters of sulfuric acid after each time interval. After the third addition the reaction mass is allowed to stand for three hours at room temperature. After that 1.5 liters of a 10% solution of aminosulfonic acid in water are added drop by drop until the solution is free of nitrous acid as determined by testing with potassium iodide-starch paper. The solution is immediately neutralized to a pH value of 7 by 2 normal sodium hydroxide.

To the thus neutralized solution there are slowly added under stirring 6.5 liters of a 2% solution of silver nitrate. After 5 minutes the solution is neutralized with about 200 cc. of 2 normal sodium hydroxide and after leaving it for 2 hours the precipitated silver salt inosine is separated by centrifugation. The residue is suspended in 6 liters of water and centrifuged once more. The separated silver salt of inosine is thus suspended in 5 liters of water and sulfided by conducting a vigorous stream of hydrogen sulfide through the solution. The precipitated silver sulfide is separated by centrifugation and washed with water. The centrifugate and wash water are neutralized with a small amount of a solution of barium hydroxide saturated at room temperature (pH value 6–6.5). Then the solution is separated from the barium sulfate by centrifugation. The clear solution is concentrated by boiling under vacuum to about 600 cc. and crystallized over night in an ice-box. The crude inosine is then filtered off by suction, washed with ice water and dried at a temperature of 105° C. Further fractions of inosine are obtained from the mother liquor by concentration the same. The yield of crude inosine is 82 g.

EXAMPLE III 10 g. of adenosine are dissolved in 500 cc. of water by warming and after cooling down to room temperature 42 g. of sodium nitrite are added to the solution. Under stirring there are added in time intervals of one hour 105 cc. of sulfuric acid after each time interval. After the third addition the reaction mass is allowed to stand for three hours at room temperature. After that 150 cc. of a 10% solution of aminosulfonic acid in water are added drop by drop until the solution is free of nitrous acid as determined by testing with potassium iodide-starch paper. The solution is then neutralized to a pH value of 7 with 2 normal sodium hydroxide. To this reaction mass are added under stirring 1.5 liters of a 0.8% solution of silver sulfate. After a second neutralization with normal sodium hydroxide the solution is allowed to stand for 2 hours. Then the precipitated silver salt of inosine is separated by centrifugation and washed two times with 500 cc. of water each time. The residue is suspended in one liter of water. To this suspension is slowly added one equivalent of hydrochloric acid (about 300 cc. or normal-HCl) compared to the precipitated silver salt of inosine. In order to avoid an excess of hydrochloric acid the pH value of the solution which is to be prevented from becoming acid is tested by means of a suitable indicator (e.g. methyl red). The precipitated silver chloride is separated by centrifugation and washed in water. The filtered solution combined with the washing water is concentrated by boiling under vacuum to about 60 cc. and crystallized in an ice box. After filtering off the crude inosine by suction it is washed with ice water and dried at a temperature of 105° C. A further fraction is obtained from the mother liquor by concentration under vacuum. The yield of crude inosine is 7.6 g.

EXAMPLE IV

Sulfuric acid of approximately 50% is added drop by drop to a solution of 498 g. of sodium nitrite in 1980 cc. of water and 198 g. of ethanol. The obtained nitric oxide is conducted into a solution of 198 g. of ethanol, 3000 cc. of water and 396 g. of concentrated sulfuric acid.

The thus formed ethyl nitrite is led under continuous stirring into a mixture of 250 g. of adenosine and 12 liters of water which has been treated with acetic acid so as to have a pH value of 3.5 and has been heated up to a temperature of about 50° C., until the whole of the adenosine is dissolved. Thereby the temperature is kept at 40–50° C. After the reaction is completed the diazotized solution of adenosine is filtered and concentrated by boiling under vacuum to 1.5 liters. This is left in the ice box for 24 hours in order to accomplish the crystallization of the inosine which is then filtered off by suction. The crude inosine is purified by recrystallizing it from 80% ethanol.

EXAMPLE V 250 g. of adenosine are dissolved in 10 liters of water. The pH of the solution is adjusted to 3.5 with acetic acid. The solution is warmed to 50–60° C., allowed to cool to 30–40° C. and then ethyl nitrite is passed through the solution under constant stirring. After passing about 80 liters of ethyl nitrite into the solution the pH value falls to approximately 3.0. By passing in of additional gas the solution becomes more acid. By the addition of small amounts of dilute sodium hydroxide the pH is maintained at between 2.9 and 3.0. After introducing a total of about 400 liters of ethyl nitrite the adenosine is quantitatively converted without any hypoxanthine being formed. The introduction of ethyl nitrite is ended, the reaction mixture is allowed to stand over night and after neutralizing the solution with sodium hydroxide to a pH value of 7 the solution is concentrated by evaporation to a volume of 1.2 liters. After standing over night in an icebox the crude inosine is filtered off by suction and dried. There is thus obtained 270.5 g. of crude inosine. Each 100 g. of the thus obtained crude inosine is re-crystallized from 2–2.5 liters of 80% ethanol. There is thus obtained 231.2 g. of pure inosine corresponding to a yield of 92.5%.

EXAMPLE VI 10 kg. of adenosine are dissolved in 400 liters of water while warming. After cooling to 30–40° C. ethyl nitrite is introduced into the solution. From the point at which a pH value of 3.0 is reached dilute sodium hydroxide is added in small amounts during the introduction of ethyl nitrite so that the pH value of the solution is maintained at between 2.9 and 3.1. A total of about 10,000 liters of ethyl nitrite is introduced during a course of reaction of about 4 hours. The reaction mass is then allowed to stand over night and then on the next day 6,000 liters of ethyl nitrite are introduced. The reaction solution is then further worked up as in Example V. There is thus obtained 9,872 g. of crude inosine and subsequently 7,712 g. of pure inosine, corresponding to a yield of 77.1%.

EXAMPLE VII

An adenosine-containing solution containing 10 kg. of adenosine is treated in two stages as in Example VI, first with about 10,000 liters of ethyl nitrite and then with about 6,000 liters of ethyl nitrite. During the entire course of the reaction the pH value of the solution is maintained at between 2.9 and 3.1 by the addition of dilute sodium hydroxide. The further working up of the solution takes place as in Example V. There is thus obtained 9,624 g. of crude inosine and subsequently 7,278 g. of pure inosine, corresponding to a yield of 72.8%.

EXAMPLE VIII 100 g. of adenosine are dissolved in 4 liters of water at 50–60° C. while stirring. After cooling down to 30–40° C. 750 g. barium nitrite (monohydrate) are added to the solution. Under stirring there are added in time intervals of one hour three times 800 cc. 2 n sulfuric acid. The solution is then allowed to stand 3 hours at room temperature. During the entire course of the reaction the pH value of the solution is maintained at between 2.9 and 3.1 by the addition of dilute sodium hydroxide. After standing 3 hours, the solution containing inosine is tested for barium, and if some barium is still present, a slight excess of sulfuric acid is added. In order to drive off the excess of nitrous acid, $CO_2$ is conducted through the solution until the solution is free of nitrous acid. The precipitated barium sulfate is separated by centrifugation. The residue is washed one time with about 2 liters of water. The filtered solution combined with the washing water is concentrated by boiling under vacuum and then worked up as set forth above. The total yield of crude inosine is 98.7 g. which is equal to 98.7%. By re-crystallizing it, there is obtained 89.3 g. of pure inosine corresponding to a yield of 89.3%.

EXAMPLE IX 250 g. of adenosine are dissolved in 10 liters of water. The pH of the solution is adjusted to 3.5 with acetic acid. The solution is warmed to 50–60° C., allowed to cool to 30–40° C. and then ethyl nitrite is passed through the solution under constant stirring. After passing a total of about 10 mols ethyl nitrite a pH value of 1.5 is reached. Additional gas is introduced to a total of about 20 mols ethyl nitrite, while maintaining the pH at 1.5 by addition of dilute sodium hydroxide. The solution is then worked up as set forth above. By re-crystallizing of the crude inosine there is obtained a yield of 78.3% pure inosine.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing and recovering inosine, the steps of treating adenosine with a de-aminating agent selected from the group consisting of nitrous acid and ethyl nitrite in an amount in excess of the amount necessary to de-aminate substantially all of said adenosine so as to form a reaction mass including inosine and being substantially free of adenosine; treating said reaction mass with a silver salt so as to convert said inosine to a silver salt thereof which can be separated from said reaction mass; separating said silver salt of inosine from said reaction mass; and recovering inosine from said separated silver salt thereof.

2. In a method of producing and recovering inosine, the steps of treating a solution of adenosine with nitrous acid in an amount in excess of the amount necessary to de-aminate substantially all of said adenosine so as to form a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

3. In a method of producing and recovering inosine, the steps of treating a solution of adenosine with nitrous acid in an amount of at least 5 mols of said nitrous acid per each mol of said adenosine so as to de-aminate substantially all of said adenosine, thereby forming a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

4. In a method of producing and recovering inosine, the steps of treating a solution of adenosine with equimolecular amounts of an inorganic nitrite and an acid adapted to react with said nitrite to form nitrous acid in an amount in excess of the amount necessary to de-aminate substantially all of said adenosine so as to form a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

5. In a method of producing and recovering inosine, the steps of treating a solution of adenosine with equimolecular amounts of an inorganic nitrite selected from the group consisting of sodium nitrite and barium nitrite and an acid selected from the group consisting of acetic acid and sulfuric acid adapted to react with said nitrite to form nitrous acid in an amount in excess of the amount sufficient to de-aminate substantially all of said adenosine so as to form a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

6. In a method of producing and recovering inosine, the steps of treating a solution of adenosine with equimolecular amounts of 10–15 mols each per mol of adenosine of an inorganic nitrite selected from the group consisting of sodium nitrite and barium nitrite and an acid selected from the group consisting of acetic acid and sulfuric acid adapted to react with said nitrite to form nitrous acid in an amount in excess of the amount sufficient to de-aminate substantially all of said adenosine so as to form a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

7. In a method of producing and recovering inosine, the steps of treating a solution of adenosine with equimolecular amounts of 10–15 mols each of barium nitrite and sulfuric acid per mol of said adenosine so as to form nitrous acid which de-aminates substantially all of said adenosine, thereby forming a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

8. In a method of producing and recovering inosine, the steps of treating a solution of adenosine with ethyl nitrite in an amount in excess of the amount necessary to de-aminate substantially all of said adenosine so as to form a reaction solution including inosine and being substantially free of adenosine; treating said reaction solution with a silver salt so as to form the silver salt of inosine which precipitates from said reaction solution; separating said silver salt of inosine from said reaction solution; and recovering inosine from said separated silver salt thereof.

9. In a method of producing and recovering inosine, the steps of treating a solution of adenosine with equimolecular amounts of 10–15 mols each per mol of adenosine of an inorganic nitrite selected from the group consisting of sodium nitrite and barium nitrite and an acid selected from the group consisting of acetic acid and sulfuric acid adapted to react with said nitrite to form nitrous acid in an amount in excess of the amount sufficient to de-aminate substantially all of said adenosine so as to form a reaction solution including inosine and being substantially free of adenosine; treating said reaction solution with silver sulfate so as to form the silver salt of inosine which precipitates from said reaction solution; separating said silver salt of inosine from said reaction solution; and recovering inosine from said separated silver salt thereof.

10. In a method of producing and recovering inosine, the steps of treating a solution of adenosine with nitrous acid in an amount in excess of the amount necessary to de-aminate substantially all of said adenosine so as to form a reaction solution including inosine and being substantially free of adenosine; treating said reaction solution with silver nitrate so as to form the silver salt of inosine which precipitates from said reaction solution; separating said silver salt of inosine from said reaction solution; and recovering inosine from said separated silver salt thereof.

11. In a method of producing and recovering inosine, the steps of treating a solution of adenosine with equimolecular amounts of 10–15 mols each per mol of adenosine of an inorganic nitrite selected from the group consisting of sodium nitrite and barium nitrite and an acid selected from the group consisting of acetic acid and sulfuric acid adapted to react with said nitrite to form nitrous acid in an amount in excess of the amount sufficient to de-aminate substantially all of said adenosine so as to form a reaction solution including inosine and being substantially free of adenosine; treating said reaction solution with silver nitrate so as to form the silver salt of inosine which precipitates from said reaction solution; separating said silver salt of inosine from said reaction solution; and recovering inosine from said separated silver salt thereof.

12. In a method of producing and recovering inosine, the steps of treating a solution of adenosine with a de-aminating agent selected from the group consisting of nitrous acid and ethyl nitrite in an amount in excess of the amount necessary to de-aminate substantially all of said adenosine so as to form a reaction solution including inosine and being substantially free of adenosine; treating said reaction solution with a silver salt so as to form a silver salt of inosine; treating said silver salt of inosine with hydrogen sulfide so as to form silver sulfide and free inosine; and recovering said free inosine.

13. In a method of producing and recovering inosine, the steps of treating a solution of adenosine with a de-aminating agent selected from the group consisting of nitrous acid and ethyl nitrite in an amount in excess of the amount necessary to de-aminate substantially all of said adenosine so as to form a reaction solution including inosine and being substantially free of adenosine; treating said reaction solution with a silver salt so as to form a silver salt of inosine; treating said silver salt of inosine with hydrochloric acid so as to form silver chloride and free inosine; and recovering said free inosine.

14. In a method of producing and recovering inosine, the steps of treating a solution of adenosine with equimolecular amounts of 10–15 mols each of barium nitrite and sulfuric acid per mol of said adenosine so as to form nitrous acid which de-aminates substantially all of said adenosine, thereby forming a reaction solution including inosine and being substantially free of adenosine; treating said reaction solution with silver sulfate so as to form the silver salt of inosine which precipitates from said reaction solution; treating said silver salt of inosine with hydrochloric acid so as to form silver chloride and free inosine; and recovering said free inosine.

15. In a method of producing and recovering inosine, the steps of treating a solution of adenosine with nitrous acid in an amount of at least 5 mols of said nitrous acid per each mol of said adenosine so as to de-aminate substantially all of said adenosine, thereby forming a reaction solution including inosine and being substantially free of adenosine; neutralizing said reaction solution; treating the thus neutralized reaction solution with silver sulfate so as to form the silver salt of inosine which precipitates from said reaction solution; treating said silver salt of inosine with hydrochloric acid so as to form silver chloride and free inosine; and recovering said free inosine.

16. In a method of producing and recovering inosine, the step of treating a solution of adenosine with nitrous acid in an amount in excess of the amount theoretically necessary to convert all of said adenosine to inosine so as to obtain a reaction solution containing inosine and being substantially free of adenosine.

17. In a method of producing and recovering inosine, the step of treating a solution of adenosine with at least 5 mols of nitrous acid per each mol of adenosine so as to substantially quantitatively convert all of said adenosine to inosine, thereby obtaining a reaction solution containing inosine and being substantially free of adenosine.

18. In a method of producing and recovering inosine, the step of treating a solution of adenosine with about 10–20 mols of nitrous acid per each mol of adenosine so as to substantially quantitatively convert all of said adenosine to inosine, thereby obtaining a reaction solution containing inosine and being substantially free of adenosine.

19. In a method of producing and recovering inosine, the step of treating adenosine in solution with nitrous acid in excess of the amount necessary to convert substantially all of said adenosine to inosine while maintaining in said solution a numerical pH value of not less than 1.5 so as to de-aminate said adenosine while preventing formation of hypoxanthine, thereby forming a reaction mass including inosine.

20. In a method of producing and recovering inosine, the step of treating adenosine in solution with nitrous acid in excess of the amount necessary to convert substantially all of said adenosine to inosine while maintaining in said solution a numerical pH value of between 1.5 and 4.0 so as to de-aminate said adenosine while preventing formation of hypoxanthine, thereby forming a reaction mass including inosine.

21. In a method of producing and recovering inosine, the step of treating adenosine in solution with a de-aminating agent selected from the group consisting of nitrous acid and ethyl nitrite in excess of the amount necessary to convert substantially all of said adenosine to inosine while maintaining in said solution a numerical pH value of not less than 1.5 so as to de-aminate said adenosine while preventing formation of hypoxanthine, thereby forming a reaction mass including inosine.

22. In a method of producing and recovering inosine, the step of treating adenosine in solution with a de-aminating agent consisting at least partly of a nitrite adapted in said solution to form nitrous acid in excess of the amount necessary to convert substantially all of said adenosine to inosine while maintaining in said solution a numerical pH value of not less than 1.5 so as to de-aminate said adenosine while preventing formation of hypoxanthine, thereby forming a reaction mass including inosine.

23. In a method of producing and recovering inosine, the steps of treating adenosine in solution with nitrous acid in excess of the amount necessary to convert substantially all of said adenosine to inosine while maintaining in said solution a numerical pH value of not less than 1.5 so to de-aminate said adenosine while preventing formation of hypoxanthine, thereby forming a reaction mass, including inosine; treating said reaction mass with a silver salt so as to convert said inosine to the silver salt thereof which can be separated from said reaction mass; separating said silver salt of inosine from said reaction mass; and recovering inosine from said separated silver salt thereof.

24. In a method of producing and recovering inosine, the steps of treating adenosine in solution with a de-aminating agent consisting at least partly of a nitrite adapted in said solution to form nitrous acid in excess of the amount necessary to convert substantially all of said adenosine to inosine while maintaining in said solution a numerical pH value of not less than 1.5 so as to de-aminate said adenosine while preventing formation of hypoxanthine, thereby forming a reaction mass including inosine; treating said reaction mass with a silver salt so as to convert said inosine to the silver salt thereof which can be separated from said reaction mass; separating said silver salt of inosine from said reaction mass; and recovering inosine from said separated silver salt thereof.

25. In a method of producing and recovering inosine, the step of treating adenosine in solution with a sufficient excess of nitrous acid to obtain in said solution a numerical pH value below 1.5 and simultaneously maintaining a numerical pH value of not less than 1.5 in said solution by neutralizing any formed nitric acid, thereby preventing formation of hypoxanthine and thus forming a reaction mass including inosine and being substantially free of hypoxanthine.

26. In a method of producing and recovering inosine, the step of treating adenosine in solution with a sufficient excess of nitrous acid to obtain in said solution a numerical pH value below 1.5 and simultaneously maintaining a numerical pH value between 1.5 and 4.0 in said solution by neutralizing any formed nitric acid, thereby preventing formation of hypoxanthine and thus forming a reaction mass including inosine and being substantially free of hypoxanthine.

27. In a method of producing and recovering inosine, the step of treating adenosine in solution with a sufficient excess of nitrous acid to obtain in said solution a numerical pH value below 1.5 and simultaneously maintaining a numerical pH value of not less than 1.5 in said solution by neutralizing any formed nitric acid with sodium hydroxide, thereby preventing formation of hypoxanthine and thus forming a reaction mass including inosine and being substantially free of hypoxanthine.

28. In a method of producing and recovering inosine, the step of treating a solution of adenosine with at least 10 mols of nitrous acid per each mol of adenosine to obtain in said solution a numerical pH value below 1.5 and simultaneously maintaining a numerical pH value of not less than 1.5 in said solution by neutralizing any formed nitric acid, thereby preventing formation of hypoxanthine and thus forming a reaction mass including inosine and being substantially free of hypoxanthine.

29. In a method of producing and recovering inosine, the step of treating adenosine in solution with a sufficient excess of a de-aminating agent selected from the group consisting of nitrous acid and ethyl nitrite to obtain in said solution a numerical pH value below 1.5 so as to de-aminate said adenosine; and maintaining in said solution a numerical pH value of not less than 1.5 by neutralizing any formed nitric acid, thereby preventing formation of hypoxanthine and thus forming a reaction mass including inosine and being substantially free of hypoxanthine.

30. In a method of producing and recovering inosine, the step of treating adenosine in solution with a de-aminating agent consisting at least partly of a nitrite adapted in said solution to form nitrous acid in an amount sufficient to obtain in said solution a numerical pH value below 1.5 so as to de-aminate said adenosine; and maintaining in said solution a numerical pH value of not less than 1.5 by neutralizing any formed nitric acid, thereby preventing formation of hypoxanthine and thus forming a reaction mass including inosine and being substantially free of hypoxanthine.

31. In a method of producing and recovering inosine, the step of treating adenosine in solution with a de-aminating agent consisting at least partly of a nitrite adapted in said solution to form nitrous acid in an amount sufficient to obtain in said solution a numerical pH value below 1.5 and simultaneously maintaining a pH value in said solution of between 1.5 and 4.0 by neutralizing any formed nitric acid, thereby preventing formation of hypoxanthine and thus forming a reaction mass including inosine and being substantially free of hypoxanthine.

32. In a method of producing and recovering inosine, the step of treating adenosine in solution with a sufficient excess of nitrous acid to obtain in said solution a numerical pH value below 1.5 so as to de-aminate said adenosine; simultaneously maintaining in said solution a numerical pH value of not less than 1.5 by neutralizing any formed nitric acid, thereby preventing formation of hypoxanthine and thus forming a reaction mass including inosine and being substantially free of hypoxanthine; treating said reaction mass with a silver salt so as to convert said inosine to the silver salt thereof which can be separated from said reaction mass; separating said silver salt of inosine from said reaction mass; and recovering inosine from said separated silver salt thereof.

References Cited in the file of this patent

UNITED STATES PATENTS 2,719,843    Davoll _____ Oct. 4, 1955

OTHER REFERENCES

Davoll: J.A.C.S. 74 (1952), pages 1563–6.
C.A., 49, 11067i and 11068a.
C.A., 39, 52714.